United States Patent
Romig

[11] Patent Number: 4,924,992
[45] Date of Patent: May 15, 1990

[54] ANTI-VIBRATION MECHANISM FOR A CLUTCH PEDAL

[75] Inventor: Kenneth L. Romig, Rochester, Mich.

[73] Assignee: General Motors Corporation, Detroit, Mich.

[21] Appl. No.: 407,171

[22] Filed: Sep. 14, 1989

[51] Int. Cl.$^5$ .................................... F16D 25/14
[52] U.S. Cl. .................... 192/30 V; 192/85 C; 192/109 F
[58] Field of Search ............... 192/30 V, 85 C, 109 F

[56] References Cited

U.S. PATENT DOCUMENTS 4,301,908  11/1981  Fudika et al. ................ 192/30 V Primary Examiner—Rodney H. Bonck
Assistant Examiner—Nicholas Whitelaw
Attorney, Agent, or Firm—Donald F. Scherer

[57] ABSTRACT

An anti-vibration system (10) for the foot pedal (11) of a hydraulic clutch release system (9) utilizes a pulse dissipating canister (30) interposed between a first conduit portion (20) and a second conduit portion (21). The first conduit portion (20) communicates between a slave cylinder (22) and the canister (30), and the second conduit portion (21) communicates between a master cylinder (15) and the canister (30). The canister (30) has a hollow interior chamber (31), which is axially bounded by laterally spaced, circular front and rear walls (32 and 34, respectively) and circumferentially bounded by an annular wall (34) which extends between the front and rear walls (32 and 33) to define the outer periphery of the canister (30). The first conduit portion (20) communicates with the hollow interior chamber (31) of the canister (30) through the center portion of the front wall (32). The second conduit portion (21) communicates with the hollow interior chamber (31) of the canister (30) along the medial portion of the annular wall (34). A plurality of resilient washers (45) may be utilized to isolate the conduit portions (20 and 21) from the floorboard (44) of the vehicle in which the anti-vibration system is installed, and a relatively short length of a flexible, radially resistant conduit portion (50) may be interposed between the canister (30) and the second conduit portion (21).

5 Claims, 4 Drawing Sheets

ANTI-VIBRATION MECHANISM FOR A CLUTCH PEDAL

TECHNICAL FIELD

The present invention relates generally to clutch actuating arrangements. More particularly, the present invention relates to a clutch release system for hydraulically actuated clutches. Specifically, the present invention relates to a mechanism for precluding vibration in the foot pedal of a hydraulically actuated, vehicular clutch release system.

BACKGROUND OF THE INVENTION

When the clutch pedal of a hydraulically actuated, vehicular clutch is depressed by the driver, a master cylinder provides fluid, under pressure, to a remote slave cylinder, and the piston shaft of the slave cylinder releases the clutch to interrupt the drive train between the engine and the wheels of the vehicle. This interruption occurs as a result of releasing the engaging pressure between the driving and driven members of the clutch assembly.

The driving members of the clutch assembly normally consist of two flat, smoothly finished surfaces. One of the two finished surfaces on the driving members is generally the rear face of the flywheel which is affixed to, and rotates with, the crankshaft of the engine. The other of the two finished surfaces is normally the opposed surface of a pressure plate. The pressure plate is usually mounted within a cover assembly that is secured to the flywheel.

The driven member of the clutch assembly is a clutch disk which is interposed between the opposed driving members. The clutch disk is, in turn, operatively secured to the transmission input shaft by which power is provided to the transmission. To accommodate wear, and to assure that the clutch plate may be properly engaged by the driving members, the clutch disk employs a splined hub which permits the clutch plate to slide axially along corresponding splines on the input shaft.

The driving and driven members are normally maintained in contact by the biasing pressure of a spring means—such as a Belleville spring which is included within the cover assembly—to assure that the frictional contact between the driving and driven members will cause the driven member to rotate with the driving members. A clutch release system is employed to overcome the biasing action of the spring means and thereby allow the driving members to rotate without imparting rotation to the driven member.

The clutch release system may be either mechanical or hydraulic, and the present invention relates to improvements with respect to the hydraulic clutch release systems.

It is generally known that the sudden applications of force caused by the initiation of each power stroke in a cylinder—i.e., by the "firing" of each cylinder—in a vehicle engine are transmitted from the engine, through the clutch and clutch release mechanism, to the foot pedal of the clutch and hence, to the foot of the vehicle operator. A standard, V-6 engine will, for example, produce three power strokes for every revolution of the crankshaft. V-6 engines ordinarily operate in the range of from about 2000 to about 5500 revolutions per minute (RPM), and the frequencies of the power strokes which provide the stated revolutions, when felt as vibrations in the foot pedal of the clutch release system, are undesirable.

Similarly, acceptable manufacturing irregularities in the flywheel which result in axial displacement to components within the clutch mechanism induce vibrations at frequencies that are mathematically dependent upon the RPM of the engine, and those vibrations are also fed, as pulsations, through the hydraulic clutch release system to be felt as vibrations in the foot pedal of the clutch release system.

Historic clutch mechanisms generally allowed sufficient slippage, or were provided with surge-suppressing, spring mechanisms that tended to dampen most torque induced vibrations and thereby reduced the transmission of undesirable pulsations through the hydraulic system of the clutch release system. However, with advancements in clutch technology, the internal friction within the clutch mechanism has reduced slippage. While this has beneficially promoted more efficient clutch operation and reduced wear, it has adversely permitted more vibrations to be transmitted to the foot pedal of the clutch.

One prior art approach utilized in an attempt to reduce the vibrations imposed upon the foot pedal of the clutch has been to supply an accumulator for use in association with hydraulic clutch release systems. Accumulators dissipate fluid pulsations by transferring the oscillatory motion into heat energy, normally through the compression and expansion of a fluid, be it a liquid or a gas.

U.S. Pat. No. 4,301,908 issued to Fukuda et al., Nov. 24, 1981, discloses an accumulator-type vibration reducing device. The device disclosed in said patent employs a piston slidably received within an oil chamber. The accumulator piston is biased by a resilient rubber, or coil spring, member so it will reciprocate in response to pulsations transmitted by the hydraulic fluid. The accumulator is interposed within the hydraulic clutch control mechanism between the foot pedal and the clutch mechanism in order to intercept and dampen hydraulic pulsations before they reach the foot pedal as vibrations. This device utilizes a number of moving parts which are, therefore, subject to wear. It is appreciated by those skilled in the art that an accumulator, by its nature and function, is subject to dynamic forces that are constantly changing in both magnitude and direction. This also induces increased wear and reduced performance. Moreover, tests have shown that while such an arrangement may be quite effective for pulsations across a wide range of frequencies, it is not necessarily effective for pulsations within all ranges of the frequencies that are typically encountered when operating a V-6 engine within the normal range of RPM previously mentioned herein.

SUMMARY OF THE INVENTION

It is therefore, a primary object of the present invention to provide an improved, hydraulic, clutch release system.

It is another object of the present invention to provide an improved, anti-vibration mechanism for the foot pedal of a clutch release system, as above, which effectively dampens pulsations in the hydraulic, clutch release system that are induced by engine vibrations and the like in order to preclude the resulting vibrations in the foot pedal of the clutch release system.

It is a further object of the present invention to provide an anti-vibration mechanism for the foot pedal of a clutch release system, as above, which dampens pulsations in the hydraulic system and is capable of withstanding prolonged subjection to such pulsations.

It is still another object of the present invention to provide an anti-vibration mechanism, as above, which dampens pulsations within a hydraulically operated clutch release system with a minimum of moving parts.

These and other objects of the invention, as well as the advantages thereof over existing and prior art forms, which will be apparent in view of the following detailed specification, are accomplished by means hereinafter described and claimed.

In general, an anti-vibration mechanism embodying the concepts of the present invention is employed in conjunction with a hydraulically actuated clutch release system. Hydraulically actuated clutch release systems normally employ a foot pedal which operates a master cylinder A slave cylinder is located remotely of the master cylinder and is operatively connected to a clutch assembly.

A conduit communicates between the master and the slave cylinders, and a pulse dissipating canister is interposed within the conduit to define a first conduit portion which extends between the slave cylinder and the canister, and second a conduit portion which extends between the master cylinder and the canister. The canister has a hollow, cylindrical, interior chamber that is axially bounded by opposed, laterally spaced, generally planar, circular front and rear walls. Extending between the perimeter of the front and rear walls is a generally annular wall which defines the perimeter of the canister. The first portion of the conduit communicates with the hollow, interior chamber of the canister at approximately the center of the front wall, and the second portion of the conduit communicates with the hollow, interior chamber of the canister through the annular wall.

Hydraulic clutch release systems employ a "hard line" conduit to communicate between the foot pedal and the clutch assembly. Resilient, isolating washers may be interposed between the hard line hydraulic conduit and the floorboard of the vehicle. In addition, a flexible, radially resilient conduit portion may be interposed between the canister and the second portion of the hard line conduit.

One exemplary, anti-vibration mechanism embodying the concepts of the present invention and adapted for use with the clutch pedal of a hydraulically actuated clutch is deemed sufficient to effect a full disclosure of the subject invention, is shown by way of example in the accompanying drawings and is described in detail without attempting to show all of the various forms and modifications in which the invention might be embodied; the invention being measured by the appended claims and not by the details of the specification.

DESCRIPTION OF AN EXEMPLARY EMBODIMENT

One representative form of an anti-vibration mechanism embodying the concepts of the present invention is designated generally by the numeral 10 on the accompanying drawings, wherein the anti-vibration mechanism 10 is depicted in conjunction with a hydraulic, clutch release system 9.

Figure 1:
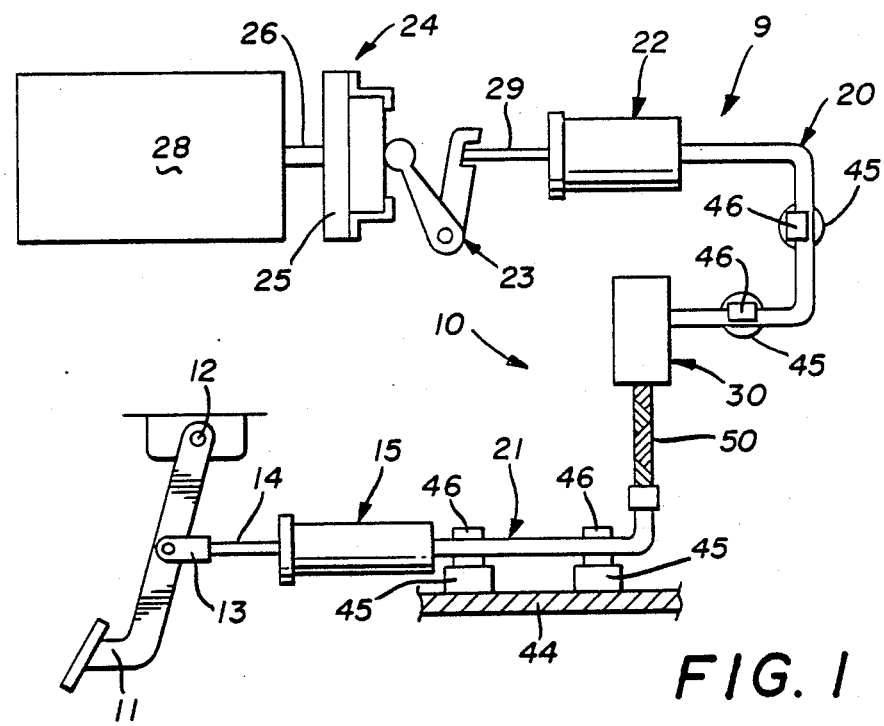
FIG. 1 is a schematic view of a hydraulic clutch release system which incorporates an anti-vibration mechanism that incorporates the concepts of the present invention.

With reference to FIG. 1, a clutch foot pedal 11 is pivotally mounted, as at 12, to the vehicle (not shown) and is operatively connected, as by a clevice 13, to piston rod 14 and the piston (not shown) to which it is conjoined within the master cylinder 15. First and second conduit portions 20 and 21, respectively, form a complete hydraulic fluid passageway which communicates between the master cylinder 12 and a remote slave cylinder 22. The slave cylinder 22 is operatively connected, as by a well known fork assembly generally designated by the numeral 23, to a similarly well known clutch assembly 24. Clutch assembly 24 includes a flywheel 25 that is affixed to the crankshaft 26 of engine 28.

As is well known to the art, when the vehicle operator depresses foot pedal 11 to actuate the master cylinder 15, the remote slave cylinder 22 is operated by the hydraulic fluid which communicates therebetween via conduit portions 20 and 21. Hence, depression of the foot pedal 11 to force the piston rod 14 into the master cylinder 15 causes the piston rod 29 of the slave cylinder 22 to protract and thereby operate the fork assembly 23 to effect a disengagement of the clutch assembly 24, thus interrupting the drive train between the engine 28 and the wheels (not shown) of the vehicle (also not shown).

Interposed between the first and second conduits 20 and 21, is a pulse dissipating canister 30. The first conduit portion 20 extends between the slave cylinder 22 and the canister 30, while the second conduit portion 21 extends between the canister 30 and the master cylinder 15.

Figures 2, 3:
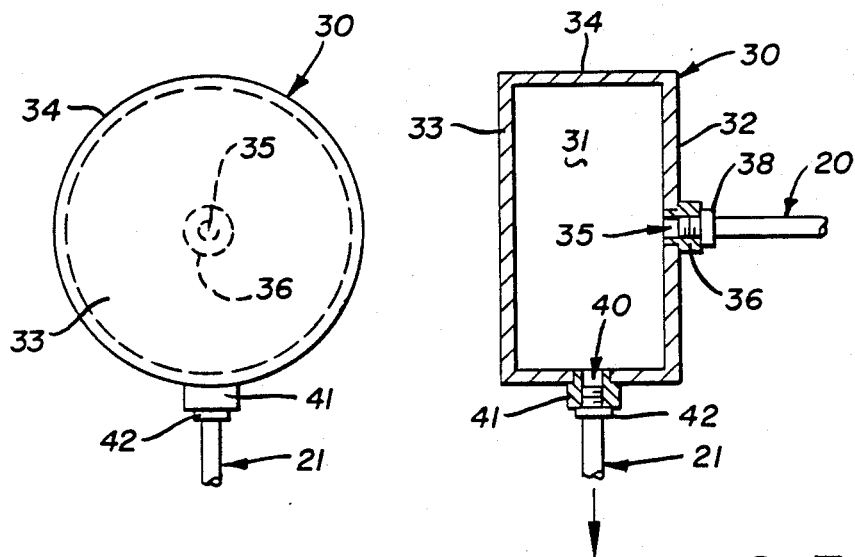
FIG. 2 is an enlarged, end elevation of a pulse d canister employed by the anti-vibration mechanism depicted in FIG. 1.
FIG. 3 is a vertical section taken substantially along line 3—3 of FIG. 2.

The canister 30 has a hollow, cylindrical interior chamber 31 (FIG. 3), the axial extent of which is bounded by opposed, laterally spaced, generally planar, circular front and rear walls 32 and 33, respectively. Extending between the perimeter of the circular front and rear walls 32 and 33 is an annular wall 34. The annular wall 34 thus defines the perimeter of canister 30.

The first conduit portion 20 communicates with the interior chamber 31 of the canister 30 through a first aperture 35. As shown, the first aperture 35 may penetrate the front wall 32, preferably at the central portion thereof. A connecting grommet 36 may be received within the first aperture 35 and be secured to the front wall 32. In such an arrangement the first conduit portion 20 may be attached to the connecting grommet 36 by a coupling connector 38. The particular connecting arrangement employed is immaterial so long as the communication between the interior chamber 31 and the first conduit portion 20 is sealed from the surrounding atmosphere and so long as the hydraulic fluid within the interior chamber 31 is free to communicate through the first conduit portion 20 with the slave cylinder 22.

The second conduit portion 21 communicates with the interior chamber 31 of the canister 30 through a second aperture 40. The second aperture 40 penetrates the annular wall 34, preferably through the medial portion thereof. A connecting grommet 41 may be received within the second aperture 40 and be secured to the annular wall 34. In such an arrangement the second conduit portion 21 may be attached to the connecting grommet 41 by a coupling connector 42. Here, too, the particular connecting arrangement employed is immaterial so long as the communication between the interior chamber 31 and the second conduit portion 21 is sealed from the surrounding atmosphere and so long as the hydraulic fluid within the interior chamber 31 is free to communicate through the second conduit portion 21 with the master cylinder 15.

As described in the Background of the Invention, when engine 28 is operating, vibrations are caused to be transmitted from the engine 28 to the clutch assembly 24. In turn, such vibrations will be transmitted through the fork assembly 23 and the piston rod 29 into the hydraulic fluid within the slave cylinder 22. The vibrations of the piston rod 29 and the piston (not shown) connected thereto create corresponding pulsations in the hydraulic fluid within the clutch release system 9 that would, without the present invention, be transmitted through the conduit portions 20 and 21 into the master cylinder 15. Those pulsations would then be felt by the foot of the vehicle operator as vibrations in the foot pedal 11. In the arrangement of the anti-vibration mechanism 10 disclosed herein, however, the pulsations are dissipated before reaching the foot pedal 11.

To return to the description of the canister 30, because the first conduit portion 20 communicates with the center of front wall 32, the pulsation also enters the canister 30 at the center of the front wall 32. As the pulsation enters the chamber 31 within the canister 30 the hydraulic fluid therein allows the pressure wave to move radially outward from the center of the front wall 32 to impinge upon the rear wall 33 as well as the annular wall 34 and be reflected back into the canister 30 as an opposing pulsation. Movement of the pulsations through the fluid within the canister as well as the interference between incoming pulsations and the pulsations reflected from the front, rear and annular walls 32, 33 and 34 tends to expend the energy of the pulsations, irrespective of their frequency.

During the process of developing, testing and evaluating the anti-vibration system 10 it was apparent that pulsations were present in the hydraulic clutch release system 9 which were created by factors in addition to the three pulses per crankshaft revolution that were induced by the initiation of the power stroke in each cylinder of the V-6 engine used during the testing procedure.

One of the other factors identified was the axial motion imparted to the clutch assembly 24 by virtue of manufacturing irregularities in the flywheel 25. It was determined that irregularities well within acceptable manufacturing tolerances produced objectionable vibrations at the foot pedal 11. Specifically, a displacement of the piston rod 29 relative to the slave cylinder 22 caused by axial displacement of the flywheel on the order of 0.0058 inches (0.147 mm) root means square, induces unacceptably noticeable vibrations to the foot pedal 11.

Additional, undefined, mechanical vibrations inherent to a dynamic system were also considered, and steps were taken to minimize their affect. For example, to preclude communication of the latter type mechanical vibration into the floorboard 44 of the vehicle, resilient, isolating washers 45 were interposed between the hydraulic conduit portions 20 and 21 and the floorboard 44 of the vehicle. Typically, the isolation washers 45 may be rubber and be interposed between the conduit connectors 46 and the floorboard 44. However, one might well interpose the isolating washers 45 between the conduit portions 20 and 21 and the connectors 46.

In addition, a length of flexible, radially resilient conduit portion 50 may be inserted between the canister 30 and the hard line conduit utilized as at least the second conduit portion 21. The flexible, radially resilient conduit portion 50 is preferably located between the canister 30 and the first connector 46 which secures the second conduit portion 21 to the floorboard 44. When the second conduit portion 21 is a standard, metallic "hard line," a length of brake line conduit may be employed quite effectively as the flexible, radially resilient conduit portion 50. In the hereinafter described test of the present invention approximately a 6 inch (15.24 cm) length of brake line conduit was employed as the flexible, radially resilient conduit 50. As is well known to the art, a brake line conduit comprises a rubber, or rubber-like, tubing that is surrounded by a close fitting metallic braid.

Thus, three structural components each contribute to the dissipation of energy evidenced by the pulsations, and it is that energy dissipation which is deemed to result in the dampening of the annoying vibrations felt in the foot pedal 11. In some installations all three structural components may be required, but in some other installations only one or two may be required.

In any event, it will be appreciated by one skilled in the art that the present invention provides a device which has no moving parts to impede the pulsations transmitted from a vehicle engine. As such, a device embodying the concepts of the present invention will be capable of withstanding the stresses to which it is subjected with considerably greater success than can be expected by a device which has a plurality of moving parts.

It has been found that varying the diameter of the front and rear walls 32 and 33, the lateral dimension of the canister 30 (as determined by the width of the annular wall 34) and the thickness of all three walls, the degree to which the pulsations are dampened may be varied. The desired dimensions for the canister 30 may, therefore, be varied according to the frequency of the pulsations expected to be received from the engine 28.

In order to demonstrate the pulsation dampening characteristics of the present invention an exemplary canister 30 was tested on a vehicle having a 3.1 liter, V-6 engine with a 5-speed transmission utilizing a hydraulic clutch release mechanism. Identical tests were performed on that vehicle (1) without any dampening device or system; (2) with a vehicle fitted with an accumulator as generally known in the art; and, (3) with a dampening installation Vibration data at the foot pedal 11 of the aforesaid vehicle was acquired by means of an accelerometer inserted between the foot pedal 11 and the connection to the piston rod 14 from the master cylinder 15 as well as by a pressure transducer inserted in the conduit portion 21 in close proximity to the master cylinder 15. Vehicle speeds of 2000 to 5500 rpm at 100 rpm increments were used for all tests.

Figure 4:
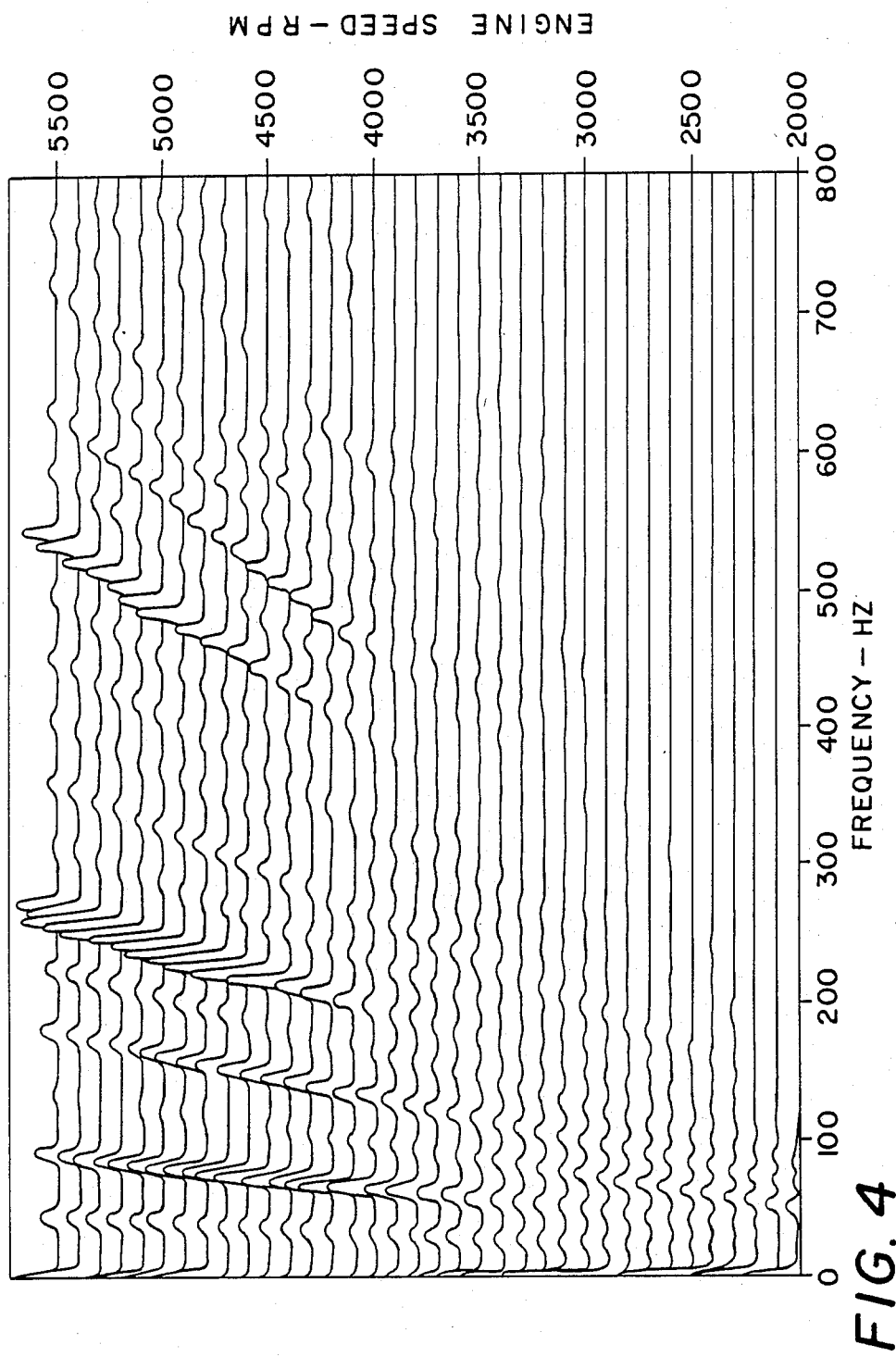
FIG. 4 is a graphic representation of the vibrations present at the foot pedal of a hydraulic clutch release system if no attempt is made to dampen the pulsations fed through the hydraulic clutch release system as a result of engine vibrations.
Figure 5:
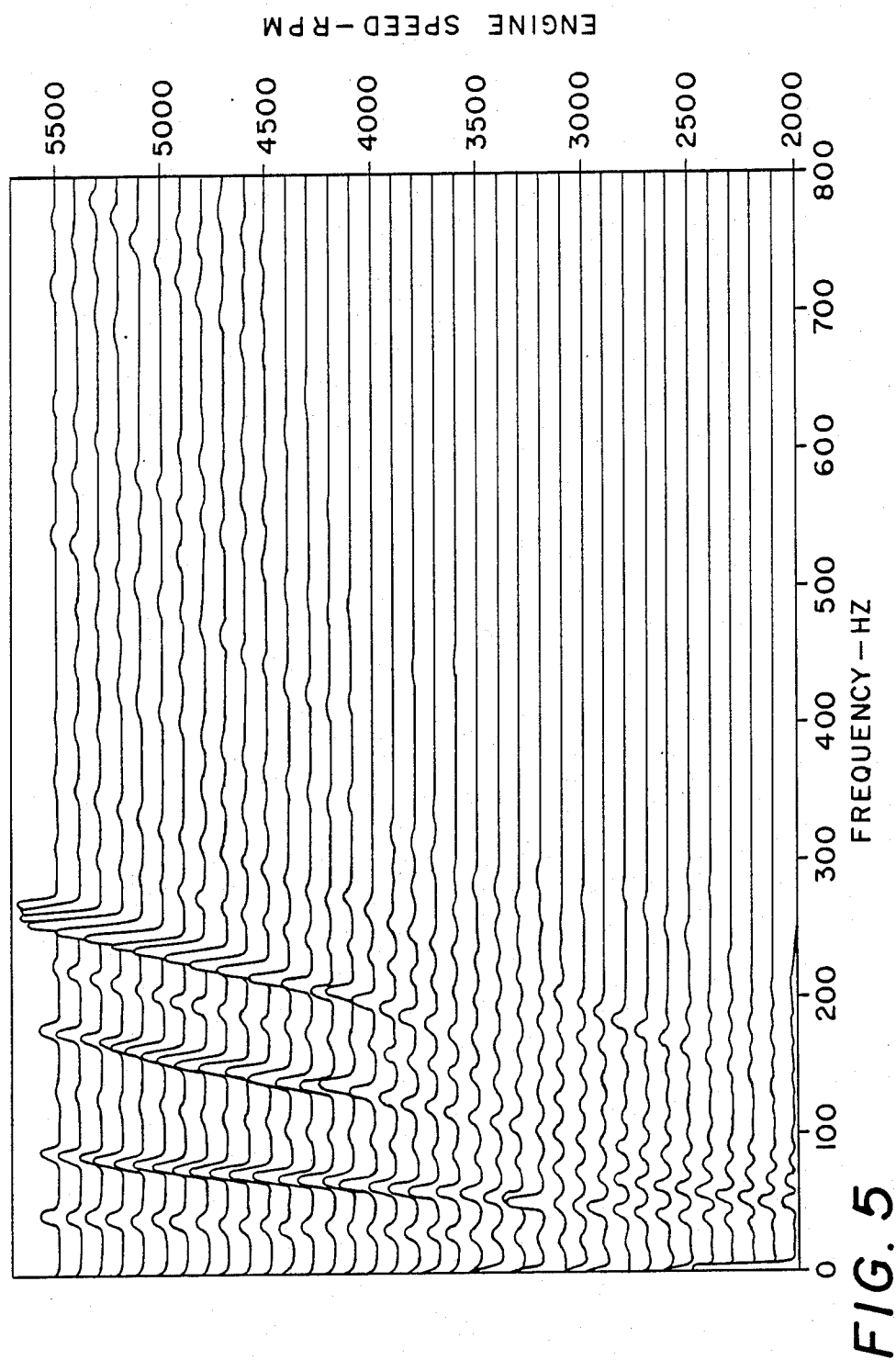
FIG. 5 is a graphic representation of the vibrations which are present at the foot pedal in a hydraulic clutch release system which employs a prior art accumulator; and, FIG. 6 is a graphic representation of the vibrations which are present at the foot pedal when a system which incorporates the concepts of the present invention is employed within the hydraulic clutch release system.
Figure 6:
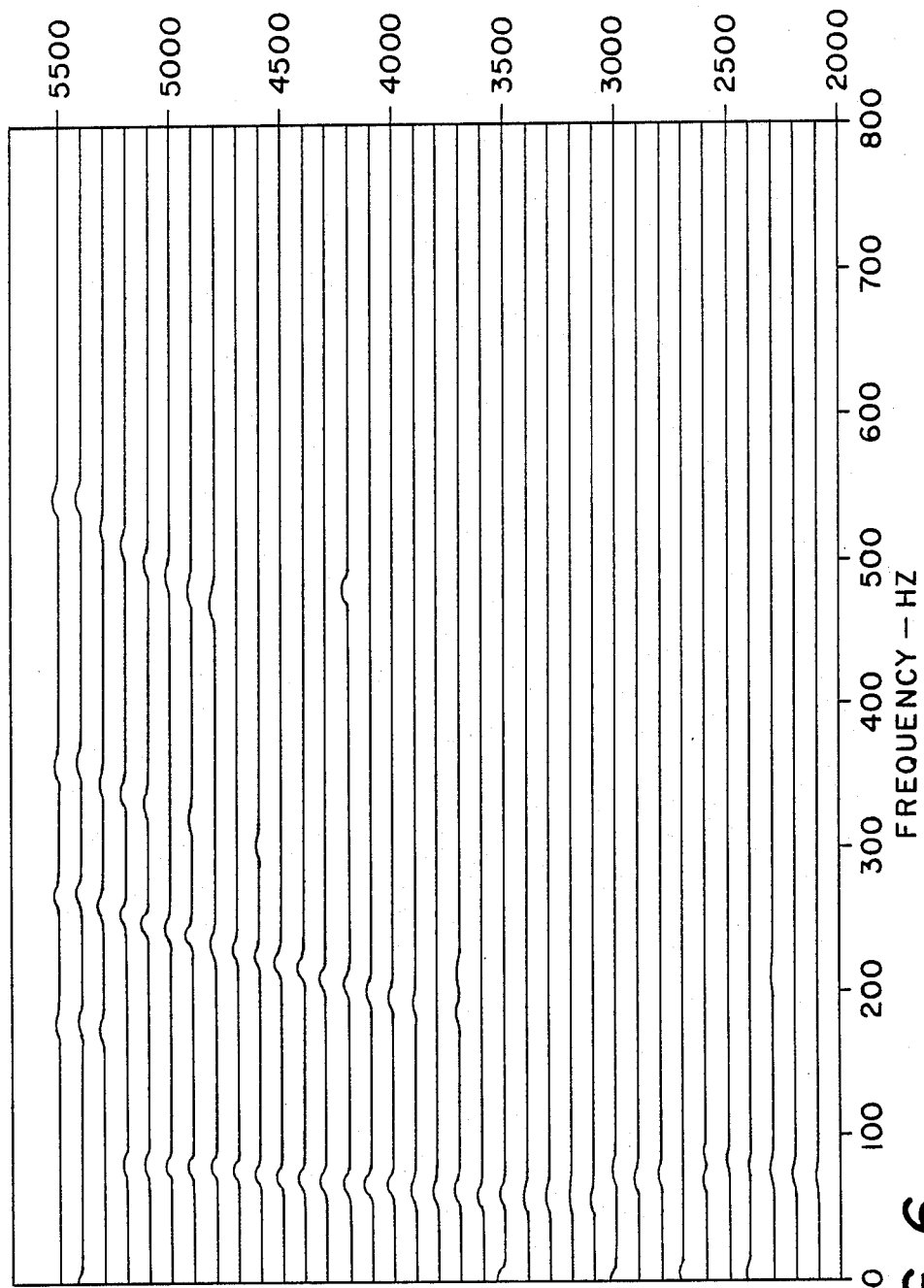

Test data was plotted on an X-Y graph for each test (FIGS. 4–6), with the X, or horizontal, axis representing the frequencies of the detected pulsations in hertz (Hz). The Y, or vertical, axis represents the engine speeds in RPM. The location of any X-Y coordinate, therefore, represents the strength of a pulsation at a given frequency at a given engine speed. The results of those tests are as follows.

Test No. 1

The vehicle was first tested without any dampening device. The results of that test were plotted on the graph depicted in FIG. 4. As can be seen, pulsations resulting in foot pedal vibrations appear at almost all of the tested frequency ranges and engine speeds. Foot pedal vibration in the 0–300 Hz range exists over all speeds, though the intensity appears to increase markedly from about 3500–6000 RPM. Above 4000 RPM there is considerable vibration across the full 0–800 Hz range. All of these vibrations are transmitted into the foot pedal 11 and may be felt by the driver.

Test No. 2

The same vehicle was then fitted with an accumulator of the type described in U.S. Pat. No. 4,301,908. The results of that test were plotted on the graph depicted in FIG. 5. As can be seen, pulsations resulting in foot pedal vibrations appear only in the range of from about 0–300 Hz, but for all tested engine speeds. Thus, while there was considerable dampening of vibrations above the 300 Hz range, the accumulator had virtually no effect on vibrations in the range of 0–300 Hz. Vibrations in that range were virtually unaffected, and such vibrations can easily be felt by the driver. On that basis the results were unacceptable.

Test No. 3

Finally, the vehicle was fitted with a pulsation dampening system embodying the concepts of the present invention. Specifically, a canister 30 having the following dimensions was inserted between the master cylinder 15 and the slave cylinder 22, as depicted schematically in FIG. 1. The front and rear walls 32 and 33, respectively were each approximately 2.75 inches (7.06 cm) in diameter. The front and rear walls 32 and 33 were connected by an annular wall 34 of such dimension that the front and rear walls 32 and 33 were approximately 1.5 inches (3.81 cm) apart. The front and rear walls 32 and 33 as well as the annular wall 34 were fabricated from metal having a thickness of approximately 0.08 inches (0.2 cm). The results of that test were plotted on the graph depicted in FIG. 6. As can be seen, virtually all pulsations were eliminated, and those that remain are of considerably less magnitude than those which resulted from tests Nos. 1 and 2. It should be noted that no pulsations greater than 600 Hz were detected It has been found that an anti-vibration system 10 embodying the concepts of the present invention, and employing a canister 30 having the dimensions utilized in conjunction with Test No. 3, and fitted to an engine such as used in the tests, decreases foot pedal vibrations by as much as 92 percent.

Moreover, because the canister 30 has no moving parts, it is capable of withstanding prolonged subjection to the pulsations associated with hydraulic clutch release systems. This is not possible with devices requiring a number of moving parts, because of the wear associated with the strenuous environment within which they will be used.

Thus it should be evident that a system embodying the concepts of the present invention effectively dampens pulsations imparted to a hydraulically actuated the clutch release system and otherwise accomplishes the objects of the invention. It should also be appreciated by one skilled in the art that the dimensions of the canister 30 may be varied depending upon the particular constraints of different engines and engine compartments, without departing from the spirit of the present invention The exemplary canister 30 described herein is merely one which provides optimum results for the specific engine tested.

The embodiments of the invention in which an exclusive property or privilege is claimed are defined as follows:

1. An anti-vibration mechanism for a foot pedal of a hydraulically actuated clutch release system comprising: a foot pedal; a master cylinder operated by said foot pedal; a clutch; a slave cylinder located remotely of said master cylinder and operatively connected to said clutch; conduit means communicating between said master and said slave cylinders; and a canister interposed within said conduit means to define a first portion of said conduit means which extends between said slave cylinder and said canister and second portion of said conduit means which extends between said master cylinder and said canister; said canister having a hollow, cylindrical, interior chamber that is bounded by opposed, laterally spaced, generally planar, circular front and rear walls and a generally annular wall defining the perimeter of said canister; said first portion of said conduit means communicating with the hollow, interior chamber of said canister at approximately the center of said front wall; said second portion of said conduit means communicating with the hollow, interior chamber of said canister through said annular wall.

2. An anti-vibration mechanism, as set forth in claim 1, further comprising: a flexible, radially resilient conduit portion inserted within said second portion of said conduit means.

3. An anti-vibration mechanism for a foot pedal of a hydraulically actuated clutch release system comprising: a floorboard; a foot pedal movable with respect to said floorboard; a master cylinder operated by said foot pedal; a clutch; a slave cylinder located remotely of said master cylinder and operatively connected to said clutch; a conduit communicating between said master and said slave cylinders; connectors securing at least a portion of said conduit to said floorboard; resilient, isolating washers associated with said connectors and interposed between said conduit and said floorboard; and a canister interposed within said conduit to define a first portion of said conduit which extends between said slave cylinder and said canister and a second portion of said conduit which extends between said master cylinder and said canister; said canister having a hollow, cylindrical, interior chamber that is bounded by opposed, laterally spaced, generally planar, circular front and rear walls and a generally annular wall defining the perimeter of said canister; said first portion of said conduit communicating with the hollow, interior chamber of said canister at approximately the center of said front wall; said second portion of said conduit communicating with the hollow, interior chamber of said canister through said annular wall.

4. An anti-vibration mechanism, as set forth in claim 3, further comprising: a flexible, radially resilient conduit portion inserted between said canister and said second portion of said conduit.

5. An anti-vibration mechanism for the foot pedal of a hydraulically actuated clutch release system comprising: a floorboard; a foot pedal movable with respect to said floorboard; a master cylinder operated by said foot pedal; a clutch; a slave cylinder located remotely of said master cylinder and operatively connected to said clutch; a conduit communicating between said master and said slave cylinders; connectors securing at least a portion of said conduit to said floorboard; resilient, isolating washers associated with said connectors and interposed between said conduit and said floor board; a canister interposed within said conduit to define a first portion of said conduit which extends between said slave cylinder and said canister and second portion of said conduit which extends between said master cylinder and said canister; said canister having a hollow, cylindrical interior chamber that is bounded by opposed, laterally spaced, generally planar, circular front and rear walls and a generally annular wall defining the perimeter of said canister; said first portion of said conduit communicating with the hollow, interior chamber of said canister at approximately the center of said front wall; said second portion of said conduit communicating with the hollow, interior chamber of said canister through the medial portion of said annular wall; and, a flexible, radially resilient conduit portion inserted within said second portion of said conduit.

* * * * *